United States Patent [19]

Harrison et al.

[11] Patent Number: 4,946,827

[45] Date of Patent: Aug. 7, 1990

[54] GLASS-TO-POLYCARBONATE ADHESIVE FOR COLOR FILTER ARRAY

[75] Inventors: Daniel J. Harrison; Paul D. Yacobucci, both of Rochester, N.Y.

[73] Assignee: Eastman Kodak Company, Rochester, N.Y.

[21] Appl. No.: 449,632

[22] Filed: Dec. 11, 1989

[51] Int. Cl.$^5$ .................. B41M 5/035; B41M 5/26
[52] U.S. Cl. ............................ 503/227; 8/471;
156/235; 156/277; 350/311; 428/1; 428/195;
428/203; 428/412; 428/430; 428/473.5;
428/913; 428/914; 430/7; 430/200; 430/201;
430/945
[58] Field of Search ............ 8/471; 156/235, 277;
350/311; 428/195, 203, 412, 430, 473.5, 913,
914; 430/7, 200, 201, 945; 503/227

[56] References Cited

U.S. PATENT DOCUMENTS

| 4,081,277 | 3/1978 | Brault et al. ............... 96/116 |
| 4,201,828 | 5/1980 | Triebel et al. .............. 428/332 |
| 4,786,148 | 11/1988 | Sakimura et al. ........... 350/339 F |

FOREIGN PATENT DOCUMENTS 2083726 3/1982 United Kingdom ............... 503/227

*Primary Examiner*—Bruce H. Hess
*Attorney, Agent, or Firm*—Harold E. Cole

[57] ABSTRACT

A glass-to-polycarbonate adhesive for a color filter array element for use in making a color liquid crystal display device comprising a glass support having thereon an adhesive layer and a polycarbonate dye-receiving layer, the adhesive layer comprising either (a) a polymer comprising the units of a linear polyester containing one or more substituted or unsubstituted aromatic diacids condensed with two or more substituted or unsubstituted aliphatic diols, said linear polyester having the formula:

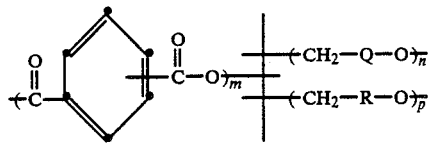

wherein:
m is 100 to 90 mole %;
n+p=m with the provision that each of n and p is at least 20 mole %; and
Q and R each independently represents a different substituted or unsubstituted difunctional linking group;

(b) a polymer comprising units of a linear polyester containing one or more substituted or unsubstituted aromatic diacids and one or more alicyclic diacids condensed with one or more aliphatic diols, said linear polyester having the formula:

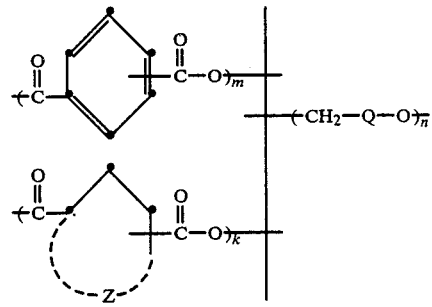

wherein
m+k is 100 to 90 mole %;
k is 5 to 50 mole %;
n=m+k; and
Z represents the atoms necessary to complete a 4-to 7-membered substituted or unsubstituted, saturated or monoethylenically unsaturated carbocyclic ring.

17 Claims, No Drawings

GLASS-TO-POLYCARBONATE ADHESIVE FOR COLOR FILTER ARRAY

This invention relates to an adhesive used to bond glass to a polycarbonate dye-receiving layer which is used in a color filter array for a liquid crystal display.

In recent years, thermal transfer systems have been developed to obtain prints from pictures which have been generated electrically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

Liquid crystal display devices are known for digital display in electronic calculators, clocks, household, appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time-consuming and very costly. Further details of this process are disclosed in U.S. Pat. No. 4,081,277. U.S. Pat. No. 4,786,148 also discloses a color filter array element which employs certain pigments.

In addition, a color filter array element to be used in a liquid crystal display device may have to undergo rather severe heating and treatment steps during manufacture. For example, a transparent conducting layer, such as indium tin oxide, is usually vacuum sputtered onto the color filter array element and then cured. This may take place at temperatures elevated as high as 200° C. for times which may be as long as one hour or more. This is followed by coating with a thin polymeric alignment layer for the liquid crystals, such as a polyimide. Regardless of the alignment layer used, the surface finish of this layer in contact with the liquid crystals is very important and may require rubbing or may require curing for up to several hours at an elevated temperature. These treatment steps can be very harmful to many color filter array elements, especially those with a gelatin matrix. In application Ser. No. 449,623 filed of even date herewith of DeBoer and Klingbiel, entitled "Method of Making Color Filter Array for Liquid Crystal Display", there is described a process of preparing a color filter array element for use in making a color liquid crystal display device comprising:

(a) overlaying a dye-receiving element with a dye-donor element, the dye-receiving element comprising a dimensionally-stable temporary support having thereon, in order, a polymeric alignment layer, a transparent conducting layer and a dye-receiving layer;

(b) imagewise heating the dye-donor element to transfer a dye image in a repeating mosaic pattern to the dye-receiving layer;

(c) removing the dye-donor element from contact with the dye-receiving element;

(d) laminating a transparent permanent support to the dye-receiving layer containing the dye image in a repeating mosaic pattern; and (e) removing the temporary support to expose one surface of the polymeric alignment layer, thereby forming the color filter array element.

There is a need in that process for finding an adhesive to bond the permanent support, such as glass, to the dye-receiving layer, such as polycarbonate. It would be desirable to provide an adhesive which would not only have good adhesivity but also must have uniform, smooth, transparent bonding that would not be degraded at the temperatures used for subsequent treatment.

These and other objects are achieved in accordance with this invention which comprises a glass-to-polycarbonate adhesive for a color filter array element for use in making a color liquid crystal display device comprising a glass support having thereon an adhesive layer and a polycarbonate dye-receiving layer, the adhesive layer comprising either
(a) a polymer comprising the units of a linear polyester containing one or more substituted or unsubstituted aromatic diacids condensed with two or more substituted or unsubstituted aliphatic diols, said linear polyester having the formula:

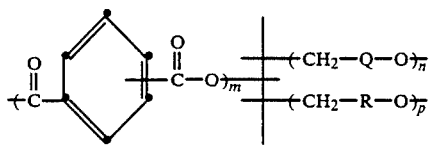

wherein:
m is 100 to 90 mole %;
n+p=m with the proviso that each of n and p is at least 20 mole %; and
Q and R each independently represents a different substituted or unsubstituted difunctional linking group;
or
(b) a polymer comprising units of a linear polyester containing one or more substituted or unsubstituted aromatic diacids and one or more alicyclic diacids condensed with one or more aliphatic diols, said linear polyester having the formula:

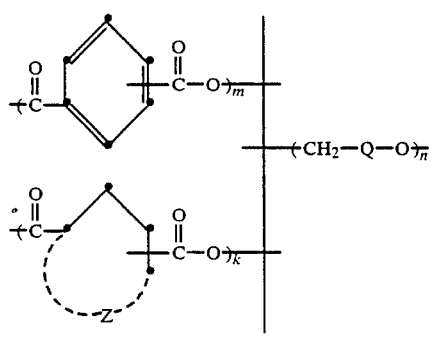

wherein
m+k is 100 to 90 mole %;
k is 5 to 50 mole %;
n=m+k; and
Z represents the atoms necessary to complete a 4-to 7-membered substituted or unsubstituted, saturated or monoethylenically unsaturated carbocyclic ring.

In a preferred embodiment of the invention, Q and R in the above formula are each independently

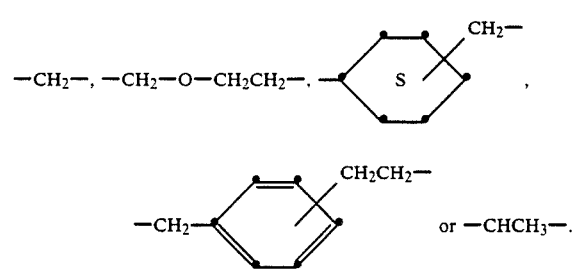

The molecular weight of the above polymer is not critical. Preferably, the molecular weight is in the range of about 10,000 to 100,000.

Specific polymers which may be used in the invention include the following:

1: A linear polyester derived from terephthalic acid and isophthalic acid (70:30 mole %) condensed with neopentylglycol, 1,4-butanediol, and 1,6-hexanediol (61:38:1 mole %)

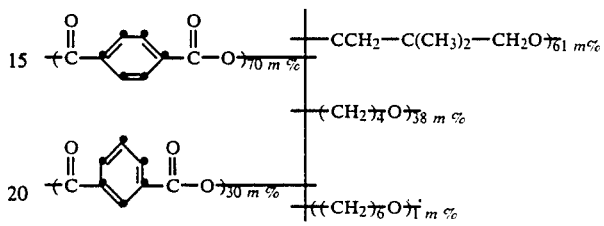

Commercially available as Bostik 7614® (Emhart Corp.) supplied in a toluene solution 2: A linear polyester derived from terephthalic acid condensed with ethyleneglycol and diethylene glycol (63:37 mole %)

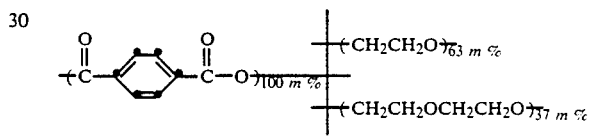

Commercially available as Kodabond 5116® (Eastman Kodak Co.) supplied as 0.025 mm thick sheets.

3: A linear polyester derived from terephthalic acid condensed with ethyleneglycol and cyclohexanedimethanol (70:30 mole %)

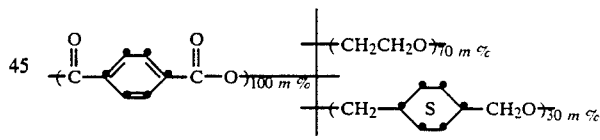

Commercially available as Kodar Polyester PETG 6763® (Tennessee Eastman Co.) supplied as 0.05 mm thick sheets.

4: A linear polyester derived from terephthalic acid and isophthalic acid (50:50 mole %) condensed with ethylene glycol and diethyleneglycol (60:40 mole %)

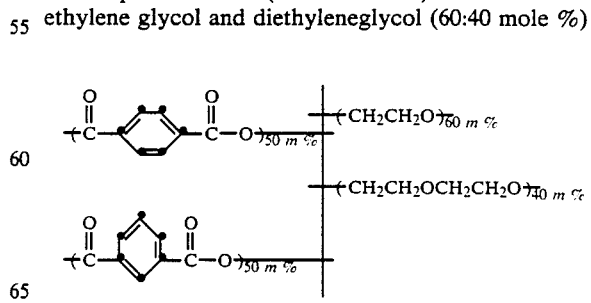

Not commercially available; prepared similar to Compound 7 described hereinafter.

5: A linear polyester derived from terephthalic acid condensed with neopentylglycol and diethylene glycol (50:50 mole %)

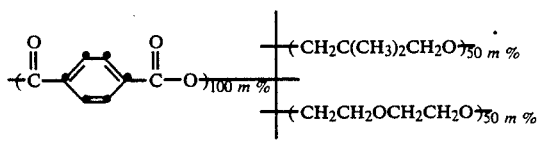

Not commercially available; prepared similar to Compound 7 described hereinafter.

6: A linear polyester derived from terephthalic acid and 1,4-cyclohexanedicarboxylic acid (50:50 mole %) condensed with propyleneglycol

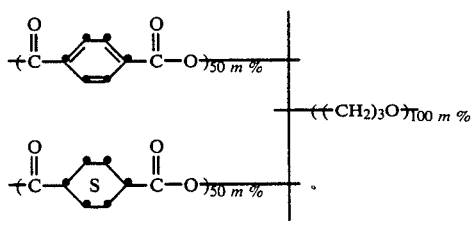

Not commercially available; prepared similar to Compound 7 described hereinafter.

7: A linear polyester derived from terephthalic acid and 1,4-cyclohexanedicarboxylic acid (80:20 mole %) condensed with 1,4-butanediol and ethyleneglycol (80:20 mole %)

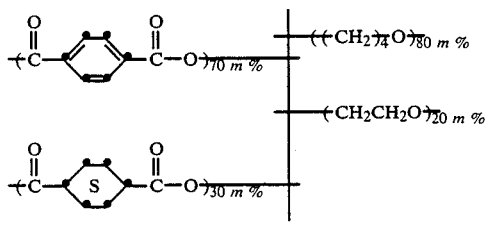

Not commercially available; preparation described hereinafter.

8: A linear polyester derived from terephthalic acid and 1,4-cyclohexanedicarboxylic acid (50:50 mole %) condensed with ethyleneglycol

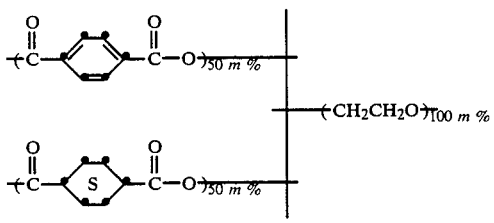

Not commercially available; prepared similar to Compound 7 described hereinafter.

In a preferred embodiment of the invention, the dye-receiving layer contains a thermally-transferred image comprising a repeating mosaic pattern of colorants in the polycarbonate binder.

In another preferred embodiment of the invention, the mosaic pattern consists of a set of red, green and blue additive primaries.

In yet another preferred embodiment of the invention, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm and do not have to be of the same size.

In a preferred embodiment of the invention, the repeating mosaic pattern of dye to form the color filter array element consists of uniform, square, linear repeating areas, with one color diagonal displacement as follows:

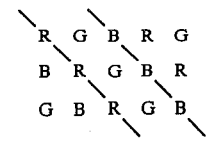

In another preferred embodiment, the above squares are approximately 100 μm.

As noted above, the color filter array elements prepared according to the invention are used in various display devices such as a liquid crystal display device. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on glass, and exciting the device by applying a voltage across the electrodes. An alignment layer is usually coated over the transparent electrode layer and is treated to provide grooves so that the liquid crystal molecules will lay down in one direction. By mounting the opposing glass plates with the axes of the treated surfaces being at 90° angles, the liquid crystal material will align itself in a twisted path through a 90° angle between the surfaces. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell which are parallel to the grooved direction, polarized light can be passed through the cell or extinguished, depending on whether or not an electric field is applied.

Thus, in another preferred embodiment of the invention, the polycarbonate dye-receiving layer has a transparent conducting layer and a polymeric alignment layer coated thereover.

The polymeric alignment layer described above may be any of the materials commonly used in the liquid crystal art. Such materials include polyimides, polyvinyl alcohol, methyl cellulose, etc.

The transparent conducting layer described above is also conventional in the liquid crystal art. Such materials include indium tin oxide, indium oxide, tin oxide, cadmium stannate, etc.

The polycarbonate dye image-receiving layer used in forming the color filter array element of the invention may comprise, for example, those polymers described in U.S. Pat. Nos. 4,695,286, 4,740,797 and 4,775,657, and U.S. Ser. No. 334,269 of Harrison et al, filed Apr. 6, 1989, the disclosures of which are hereby incorporated by reference. In a preferred embodiment, polycarbonates derived from a methylene substituted bisphenol-A are employed such as 4,4'-(hexahydro-4,7-methanoindan-5-ylidene) bisphenol. In general, good results have been obtained at a coverage of from about 0.25 to about 5 g/m².

The glass support employed in the invention may be borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element of the invention comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes including anthraquinone dyes, e.g., Sumikalon Violet RS ® (Sumitomo Chemical Co., Ltd.), Dianix Fast Violet 3R-FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.,); direct dyes such as Direct Dark Green B ® (Mitsubishi Chemical Industries, Ltd.) and Direct Brown M ® and Direct Fast Black D ® (Nippon Kayaku Co., Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

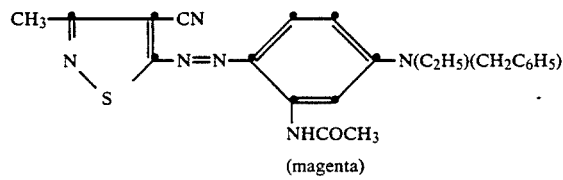

(magenta)

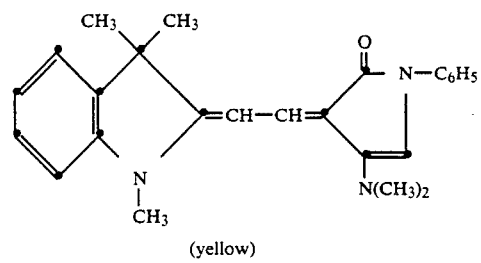

(yellow)

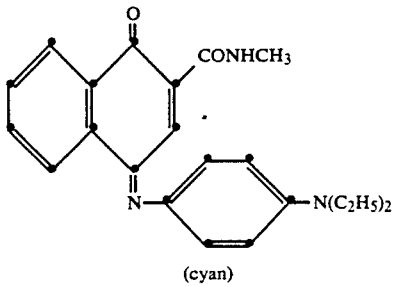

(cyan)

or any of the dyes disclosed in U.S. Pat. Nos. 4,541,830, 4,541,830, ,4698,651, 4,695,287; 4,701,439, 4,757,046, 4,743,582, 4,769,360 and 4,753,922, the disclosures of which are hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

Various methods may be used to transfer dye from the dye donor to the transparent support to form the color filter array element of the invention. There may be used, for example, a high intensity light flash technique with a dye-donor containing an energy absorptive material such as carbon black or a light-absorbing dye. Such a donor may be used in conjunction with a mirror which has a grid pattern formed by etching with a photoresist material. This method is described more fully in U.S. application Ser. No. 408,581 by Simons entitled "Method of Making a Color Filter Array Using Light Flash", filed Sept. 18, 1989.

Another method of transferring dye from the dye donor to the transparent support to form the color filter array element of the invention is to use a heated embossed roller as described more fully in U.S. application Ser. No. 408,580 by Simons entitled "Method of Making a Color Filter Array Using a Heated Embossed Surface", filed Sept. 18, 1989.

In a preferred embodiment of the invention, the imagewise-heating is done by means of a laser using a dye-donor element comprising a support having thereon a dye layer and an absorbing material for the laser, said imagewise-heating being done in such a way as to produce a repeating mosaic pattern of colorants.

Any material that absorbs the laser energy may be used as the absorbing material described above for the laser such as carbon black or non-volatile infrared-absorbing dyes or pigments which are well known to those skilled in the art. Cyanine infrared absorbing dyes may also be employed with infrared diode lasers as described in DeBoer Application Serial Number 363,836 filed Jun. 9, 1989, the disclosure of which is hereby incorporated by reference.

Several different kinds of lasers could conceivably be used to effect the thermal transfer of dye from a donor sheet to the dye-receiving element to form the color filter array element, such as ion gas lasers like argon and krypton; metal vapor lasers such as copper, gold, and cadmium; solid-state lasers such as ruby or YAG; or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye-donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye-donor element to the dye image-receiving element to form the color filter array element of the invention are available commercially. There can be employed, for example, Laser Model SDL-2420-H2 ® from Spectra Diode Labs, or Laser Model SLD 304 V/M ® from Sony Corp.

After the dyes are transferred to the receiver, the image may be treated to further diffuse the dye into the dye-receiving layer in order to stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following examples are provided to illustrate the invention.

EXAMPLE 1

Preparation of a linear polyester (derived from terephthalic acid and 1,4-cyclohexanedicarboxylic acid (70:30 mole %) condensed with 1,4-butanediol and ethylene glycol (80:20 mole %) (Polymer 7)

In a 500 ml polymer flask equipped with a vigreax-claissen head and nitrogen inlet tube was placed dimethyl terephthalate (68 g, 0.35 mole), dimethyl 1,4-cyclohexanedicarboxylate (30 g, 0.15 mole), 1,4-butanediol (46.9 g, 0.52 mole) and ethylene glycol (10.7 g, 0.17 mole). The flask was immersed in a 220° C. salt bath with the contents under nitrogen. After melting the mixture, tetraisopropylorthotitanate (6 drops) was added and the melt was heated at 220° C. with nitrogen bubbling. After heating for 2 hours the bath temperature was raised to 240° C. and held at that temperature for another 2 hours. Throughout this heating schedule, distillate was collected from the head takeoff. At this time, the sidearm was opened and heating at 225° C. was continued for another hour. The head and nitrogen addition tube were removed and a stainless steel blade stirrer was installed. The pressure in the flask was reduced to 0.2 mm through the sidearm and the reaction mixture was stirred for 1 hour. At this time the melt viscosity of the polymer became extremely high. The flask was removed from the bath, cooled, and the polymer was isolated. Estimated mw=41, 700, Tg=21° C. for the polymer product.

Polymers 4, 5, 6 and 8 of the invention and comparison polymer C-2 were prepared in a similar manner.

EXAMPLE 2

This example describes a test designed to evaluate the image smear produced when a parallel line test image of magenta dye thermally transferred to a polycarbonate receiving layer was laminated to borosilicate glass using the linear polyester adhesive of the invention.

The parallel-line test image consisted of a series of parallel line pairs 6.4 to 0.2 lines/mm apart (i.e., line width and line separation 0.08 mm to 2.5 mm) and was created by thermal dye-transfer using a magenta-dye donor and thermal head. This image was for evaluation purposes only and was considered representative of the color filter array that would be used for a liquid crystal display.

In addition to evaluation of the invention polymers for resolution, the following comparison polymers were evaluated which are linear polyesters but do not contain an alicyclic diacid and have only one aliphatic diol:

C-1: A linear polyester derived from terephthalic acid, isophthalic acid, and sebacic acid (35:50:15 mole %) condensed with 1,4-butanediol

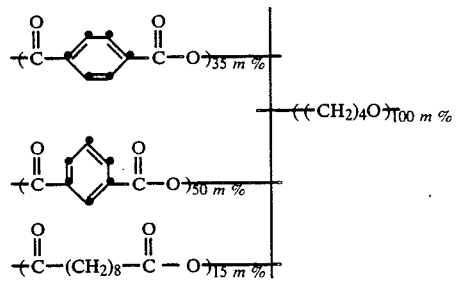

Available commerically as Bostik 302 ® (Emhart Corp.) supplied as 0.05 mm thick sheets.

C-2 A linear polyester derived from terephthalic acid condensed with diethyleneglycol

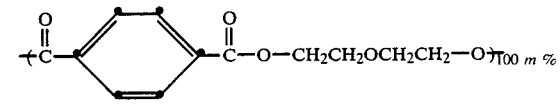

Not available commercially; prepared similar to Compound 7 above.

C-3 A linear polyester derived from terephthalic acid and isophthalic acid (83:17 mole %) condensed with 1,4-cyclohexanedimethanol

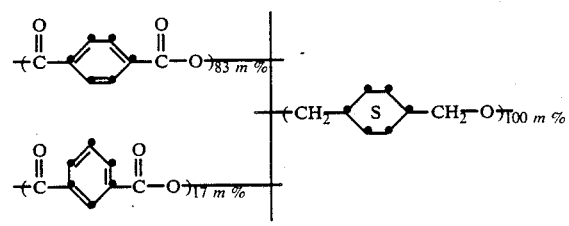

Available commercially as Polyester A150 (Tennessee Eastman Co.), supplied as 0.025 mm thick sheets.

A dye-receiver composite was prepared as follows:

On top of a 75 μm thick duPont Kapton ® support, the following layers were coated in order:

(a) a polymeric alignment layer similar to the preimidized polymer of Example 1 of Application Serial No. filed of even date herewith of DeBoer and Klingbiel, as described above, (0.5 g/m²);

(b) a transparent indium tin oxide conducting layer (0.2 μm thick) using reactive sputtering of a metal target as described in Example 1 of the above-described application of DeBoer and Klingbiel;

(c) a subbing layer of poly(acrylonitrile-co-vinylidene chloride-co-acrylic acid) (14:79:7 wt ratio) (0.54 g/m²); and
(d) a dye-receiving layer of the following polycarbonate derived from 4,4'-hexahydro-4,7-methanoindan-5-ylidene)bisphenol (Tg=260° C.) (2.9 g/m²) coated from a methylene chloride and tichloroethylene solvent mixture:

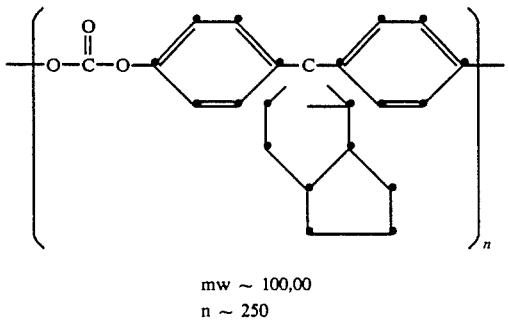

mw ~ 100,00
n ~ 250

For transfer of the parallel-line test image of a magenta dye, a dye-donor was prepared consisting of the following layers coated on a 6 μm poly(ethylene terephthalate) support:
(1) Subbing layer of duPont Tyzor TBT ® titanium tetra-n-butoxide (0.16 g/m²) coated from a n-butyl alcohol and n-propyl-acetate solvent mixture, and
(2) Dye layer containing the magenta dye illustrated above (0.15 g/m²) and FC-431 ® surfactant (3M Corp.) (0.002 g/m²), in a cellulose acetate-propionate (2.5% acetyl, 48% propionyl) binder (0.39 g/m²) coated from a cyclopentanone, toluene, and methanol solvent mixture.

A slipping layer was coated on the back side of the element similar to that disclosed in U.S. Pat. No. 4,829,050.

The parallel-line test image of the magenta dye was transferred to the dye-receiver composite in the following manner. The dye side of the dye-donor element strip was placed in contact with the dye-receiving layer of the composite described above. The assemblage was clamped to a stepper-motor driven 60 mm diameter rubber roller and a TDK Thermal Head L-231 (thermostatted at 26° C.) was pressed with a force of 36 Newtons against the dye-donor element side of the assemblage pushing it against the rubber roller.

The imaging electronics were activated causing the donor-receiving assemblage to be drawn through the printing head/roller nip at 6.9 mm/sec. Coincidentally the resistive elements in the thermal print head were pulsed for 29 μsec/pulse at 128 μsec intervals during the 33 msec/dot printing time. A maximum density image was generated at 255 pulses/dot. The voltage supplied to the printing head was approximately 23.5 volts, resulting in an instantaneous peak power of 1.3 watts/dot and maximum total energy of 9.6 mJoules/dot.

After transfer, the dye-receiver composite was separated from the dye-donor and heat fused with an infrared lamp at 205° C. for one minute.

On top of a 1 mm thick flat borosilicate glass equal in area to that of the transferred area of the parallel-line test image, a layer of the indicated invention polyester or comparison polyester dissolved in either cyclopentanone or a cyclopentanone-dichloromethane solvent mixture was spin-coated for 2 min at 500 rpm to provide a layer of at least 0.5 g/m² or more. The glass and coated polyester was dried for 30 min at 100° C. Those adhesive polyester materials supplied in sheet form required no spin coating and were directly used for lamination.

The polyester adhesive coated on glass was laminated to the imaged dye-receiver composite using a Laminex Co. PAK-III-E ® single roller-feed laminating device. Lamination temperatures were adjusted from 177° to 230° C. Those adhesive polyesters supplied in sheet form were laminated directly.

The effectiveness of the glass-to-polycarbonate bonding was evaluated by the ability of the polyester adhesive to permit removal of the imaged polycarbonate layer from the temporary support. In the lamination step, all samples, except for one control polyester which did not bond, peeled at the temporary support interface indicating sufficiently strong adhesion between either the glass-to-polyester interface or the polyester-to-polycarbonate receiver interface.

After removal of the temporary support, all samples were incubated for 2 hours at 180° C. The resolution of the parallel-line test image was then evaluated using a low-power magnifier to determine the narrowest line pair visible without distortion. The following results were obtained:

TABLE 1

| Adhesive Polyester | Lamination Temp. | Limit of Resolution after Treatment 2 hr/180° C. |
|---|---|---|
| C-1 | 177° C. | 0.2 lines/mm |
| C-2 | 177° C. | 0.4 lines/mm |
| C-3 | * | * |
| Polym. 1 | 200° C. | 1.6 |
| Polym. 2 | 200° C. | 3.2 |
| Polym. 3 | 200° C. | 3.2 |
| Polym. 4 | 177° C. | 3.2 |
| Polym. 5 | 177° C. | 3.2 |
| Polym. 6 | 200° C. | 1.6 |
| Polym. 7 | 230° C. | 1.6 |
| Polym. 8 | 177° C. | 3.2 |

*Could not bond sheet-adhesive polyester to glass during lamination step

The above results indicate that the polyester adhesives of the invention are superior for resolution maintenance after exposure to high temperatures in comparison to several control polyesters.

The invention has been described in detail with particular reference to preferred embodiments thereof, but it will be understood that variations and modifications can be effected within the spirit and scope of the invention.

What is claimed is:
1. A color filter array element for use in making a color liquid crystal display device comprising a glass support having thereon an adhesive layer and a polycarbonate dye-receiving layer, said adhesive layer comprising either
(a) a polymer comprising the units of a linear polyester containing one or more substituted or unsubstituted aromatic diacids condensed with two or more substituted or unsubstituted aliphatic diols, said linear polyester having the formula:

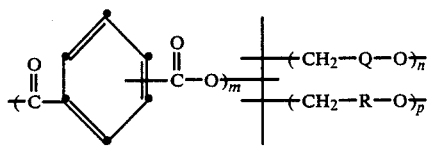

wherein:

m is 100 to 90 mole %;

n+p=m with the proviso that each of n and p is at least 20 mole %; and

Q and R each independently represents a different substituted or unsubstituted difunctional linking group;

or (b) a polymer comprising units of a linear polyester containing one or more substituted or unsubstituted aromatic diacids and one or more alicyclic diacids condensed with one or more aliphatic diols, said linear polyester having the formula:

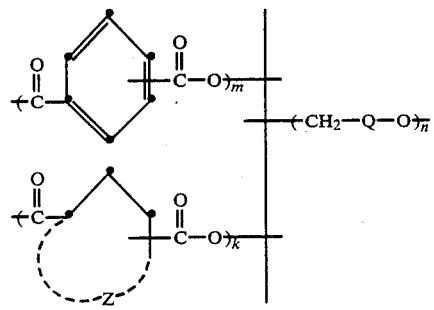

wherein m+k is 100 to 90 mole %;

k is 5 to 50 mole %;

n=m+k; and

Z represents the atoms necessary to complete a 4-to 7-membered substituted or unsubstituted, saturated or monethylenically unsaturated carbocyclic ring.

2. The element of claim 1 wherein said Q and R are each independently

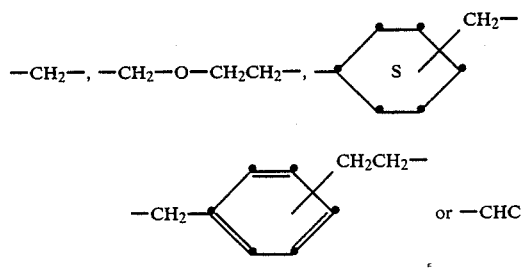

3. The element of claim 1 wherein said dye-receiving layer contains a thermally-transferred image comprising a repeating mosaic pattern of colorants in said polycarbonate binder.

4. The element of claim 3 wherein said pattern consists of a set of red, green and blue additive primaries.

5. The element of claim 4 wherein each said primary color and each said set of primary colors are separated from each other by an opaque area.

6. The element of claim 5 wherein said opaque areas form a black grid.

7. The element of claim 1 wherein a transparent conducting layer and a polymeric alignment layer are coated over said polycarbonate dye-receiving layer.

8. The element of claim 7 wherein said polymeric alignment layer is a polymeric diimide.

9. The element of claim 7 wherein said transparent conducting layer is indium tin oxide.

10. A process of preparing a color filter array element for use in making a color liquid crystal display device comprising:

(a) overlaying a dye-receiving element with a dye-donor element, said dye-receiving element comprising a dimensionally-stable temporary support having thereon, in order, a polymeric alignment layer, a transparent conducting layer and a polycarbonate dye-receiving layer;

(b) imagewise heating said dye-donor element to transfer a dye image in a repeating mosaic pattern to said dye-receiving layer;

(c) removing said dye-donor element from contact with said dye-receiving element;

(d) laminating a transparent glass support to said polycarbonate dye-receiving layer containing said dye image in a repeating mosaic pattern by use of an adhesive layer; and (e) removing said temporary support to expose one surface of said polymeric alignment layer, thereby forming said color filter array element, said adhesive layer comprising either (a) a polymer comprising the units of a linear polyester containing one or more substituted or unsubstituted aromatic diacids condensed with two or more substituted or unsubstituted aliphatic diols, said linear polyester having the formula:

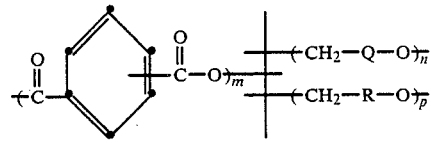

wherein:

m is 100 to 90 mole %;

n+p=m with the proviso that each of n and p is at least 20 mole %; and

Q and R each independently represents a different substituted or unsubstituted difunctional linking group;

or (b) a polymer comprising units of a linear polyester containing one or more substituted or unsubstituted aromatic diacids and one or more alicyclic diacids condensed with one or more aliphatic diols, said linear polyester having the formula:

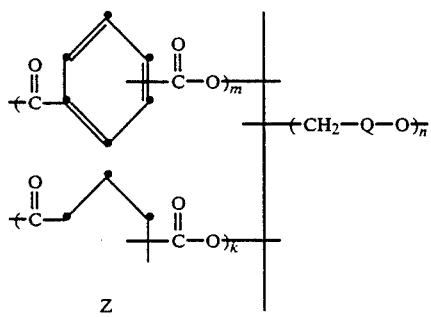

wherein
m+k is 100 to 90 mole %;
k is 5 to 50 mole %;
n=m+k; and
Z represents the atoms necessary to complete a 4- to 7-membered substituted or unsubstituted, saturated or monoethylenically unsaturated carbocyclic ring.

11. The process of claim 10 wherein said imagewise-heating is done by means of a laser using a dye-donor element comprising a support having thereon a dye layer and an absorbing material for the laser.

12. The process of claim 10 wherein said Q and R are each independently

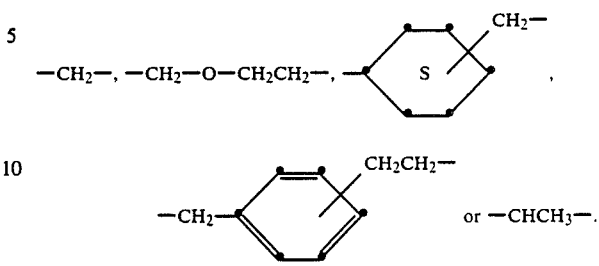

13. The process of claim 10 wherein said polymeric alignment layer is a polymeric diimide.

14. The process of claim 10 wherein said transparent conducting layer is indium tin oxide.

15. The process of claim 10 wherein said pattern consists of a set of red, green and blue additive primaries.

16. The process of claim 15 wherein each said primary color and each said set of primary colors are separated from each other by an opaque area.

17. The process of claim 16 wherein said opaque areas form a black grid.

* * * * *